US007415897B2

(12) United States Patent
Shiao

(10) Patent No.: US 7,415,897 B2
(45) Date of Patent: Aug. 26, 2008

(54) ELECTRONIC TORQUE WRENCH

(76) Inventor: Hsuan-Sen Shiao, No. 55, Cheng-Feng Lane, Tai-Ming Rd., Wu-Jih Hsiang, Taichung Hsien (TW)

( * ) Notice: Subject to any disclaimer, the term of this patent is extended or adjusted under 35 U.S.C. 154(b) by 136 days.

(21) Appl. No.: 11/636,875

(22) Filed: Dec. 11, 2006

(65) Prior Publication Data

US 2008/0134845 A1 Jun. 12, 2008

(51) Int. Cl.
*G01L 5/24* (2006.01)

(52) U.S. Cl. ............... 73/862.21; 73/862.08; 73/862.23

(58) Field of Classification Search ............. 73/862.08, 73/862.21, 862.23
See application file for complete search history.

(56) References Cited

U.S. PATENT DOCUMENTS 4,958,541 A * 9/1990 Annis et al. .................. 81/479
6,681,663 B1 * 1/2004 Hsien .......................... 81/463
6,928,885 B1 * 8/2005 Shiao et al. .............. 73/862.21
6,948,380 B1 * 9/2005 Shiao et al. .............. 73/862.21
7,107,884 B2 * 9/2006 Cutler et al. .................. 81/479
7,313,990 B1 * 1/2008 Shiao et al. .................. 81/479

* cited by examiner

*Primary Examiner*—Edward Lefkowitz
*Assistant Examiner*—Freddie Kirkland, III
(74) *Attorney, Agent, or Firm*—Ladas & Parry LLP

(57) ABSTRACT

An electronic torque wrench includes a head portion, a handle portion connected to the head portion and having a receiving space, a strain sensor unit disposed in the head portion, and an indicator unit disposed in the receiving space and having a moving unit. The handle portion further has a tubular wall with a through hole communicated with the receiving space. The moving unit has a touching member aligned with the through hole and movable between first and second positions, where the touching member protrudes outwardly of and retracts into the through hole, respectively. A controlling unit is connected electrically to the strain sensor unit and the moving unit, and actuates the touching member when the strain sensor unit detects a torque that is larger than a reference torque level.

6 Claims, 6 Drawing Sheets

ELECTRONIC TORQUE WRENCH

BACKGROUND OF THE INVENTION

1. Field of the Invention

The invention relates to a wrench, more particularly to an electronic torque wrench.

2. Description of the Related Art

Referring to FIG. 1, a conventional electronic torque wrench, as disclosed in U.S. Pat. No. 4,958,541, includes a ratchet head 1, a deflection beam 2 connected to the ratchet head 1, a plurality of strain gauges 3 fixed to two sides of the deflection beam 2, a handle 4 connected to the deflection beam 2, a circuit board 5 disposed within the handle 4 and connected electrically to the strain gauges 3, a tactile indication generator 6 disposed within the handle 4 and connected electrically to the circuit board 5, and a battery 7 disposed within the handle 4 and connected electrically to the circuit board 5 and the indication generator 6. The indication generator 6 has an electric motor 601, and a mass 602 fixed eccentrically to a shaft of the motor 601.

When a user rotates a workpiece (not shown) using the conventional electronic torque wrench, the strain gauges 3 transmit electrical signals corresponding to a detected torque to the circuit board 5. If the torque is greater than a reference torque level, the circuit board 5 actuates the motor 601 to rotate the mass 602. Since the mass 602 is eccentrically mounted on the motor 601, it will tend to vibrate the motor 601 as it rotates. The vibration is transmitted to the handle 4, thereby warning the user to stop the operation.

Although the aforementioned conventional electronic torque wrench can achieve its intended purpose, since the vibration force provided by the indication generator 6 is limited, the user may not feel the vibration, and thus miss the warning.

SUMMARY OF THE INVENTION

Therefore, the object of the present invention is to provide an electronic torque wrench that can produce a direct warning to a user's hand.

According to this invention, an electronic torque wrench comprises a main body, a strain sensor unit, an indicator unit, and a controlling unit. The main body has a head portion, and a handle portion connected to the head portion. The handle portion has a tubular wall, and a receiving space defined by the tubular wall. The tubular wall has a through hole communicated with the receiving space. The strain sensor unit is disposed in the head portion. The indicator unit is disposed in the receiving space, and includes a moving unit. The moving unit has a touching member aligned with the through hole and movable between a first position, where the touching member protrudes outwardly of the through hole, and a second position, where the touching member retracts into the through hole. The controlling unit is disposed in the main body, and is connected electrically to the strain sensor unit and the moving unit. The controlling unit actuates the touching member when the strain sensor unit detects a torque that is larger than a reference torque level.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
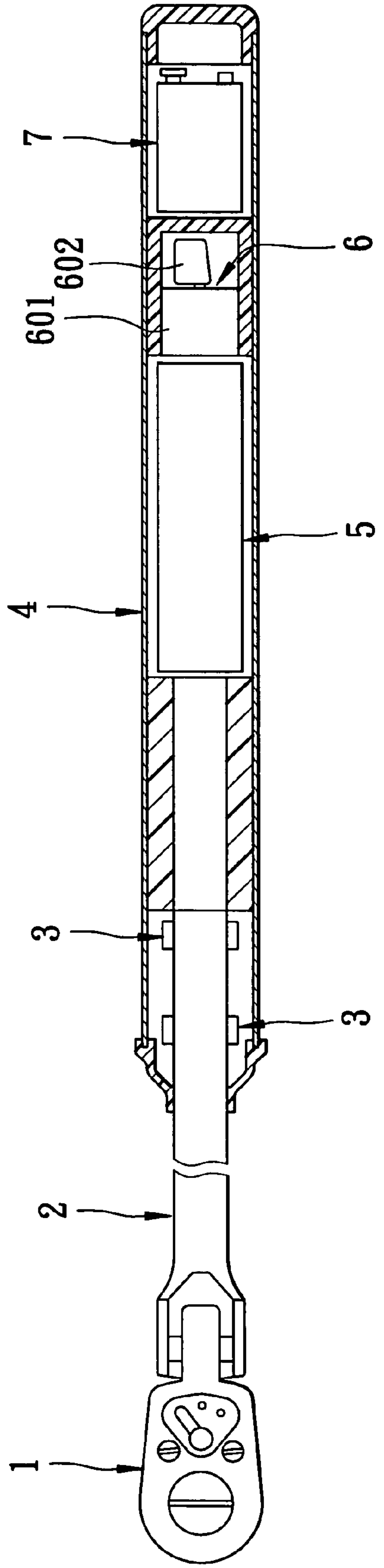
FIG. 1 PRIOR ART
FIG. 1 is a sectional view of a conventional electronic torque wrench disclosed in U.S. Pat. No. 4,958,541.
Figure 2:
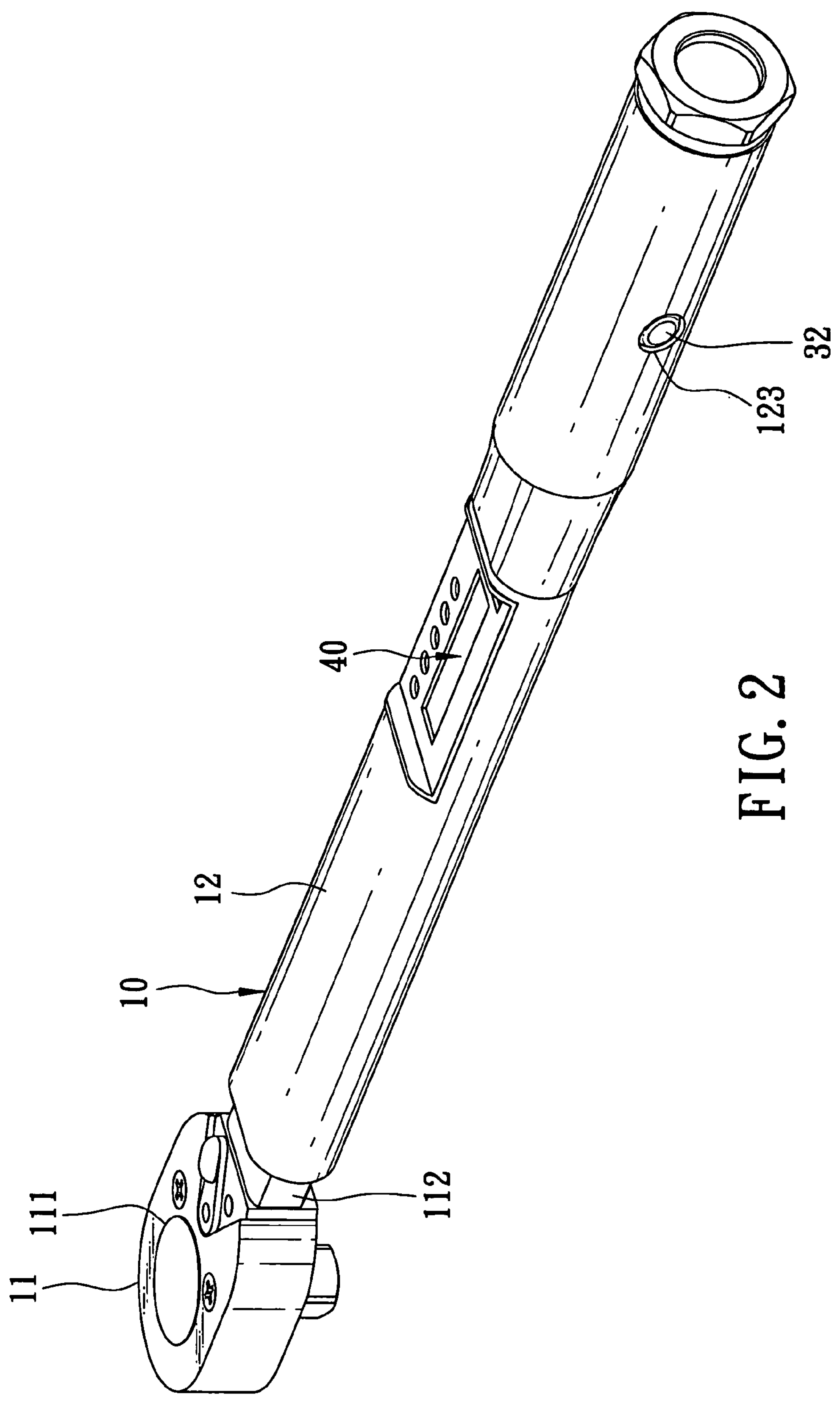
FIG. 2 is a perspective view of the preferred embodiment of an electronic torque wrench according to the present invention.
Figure 3:
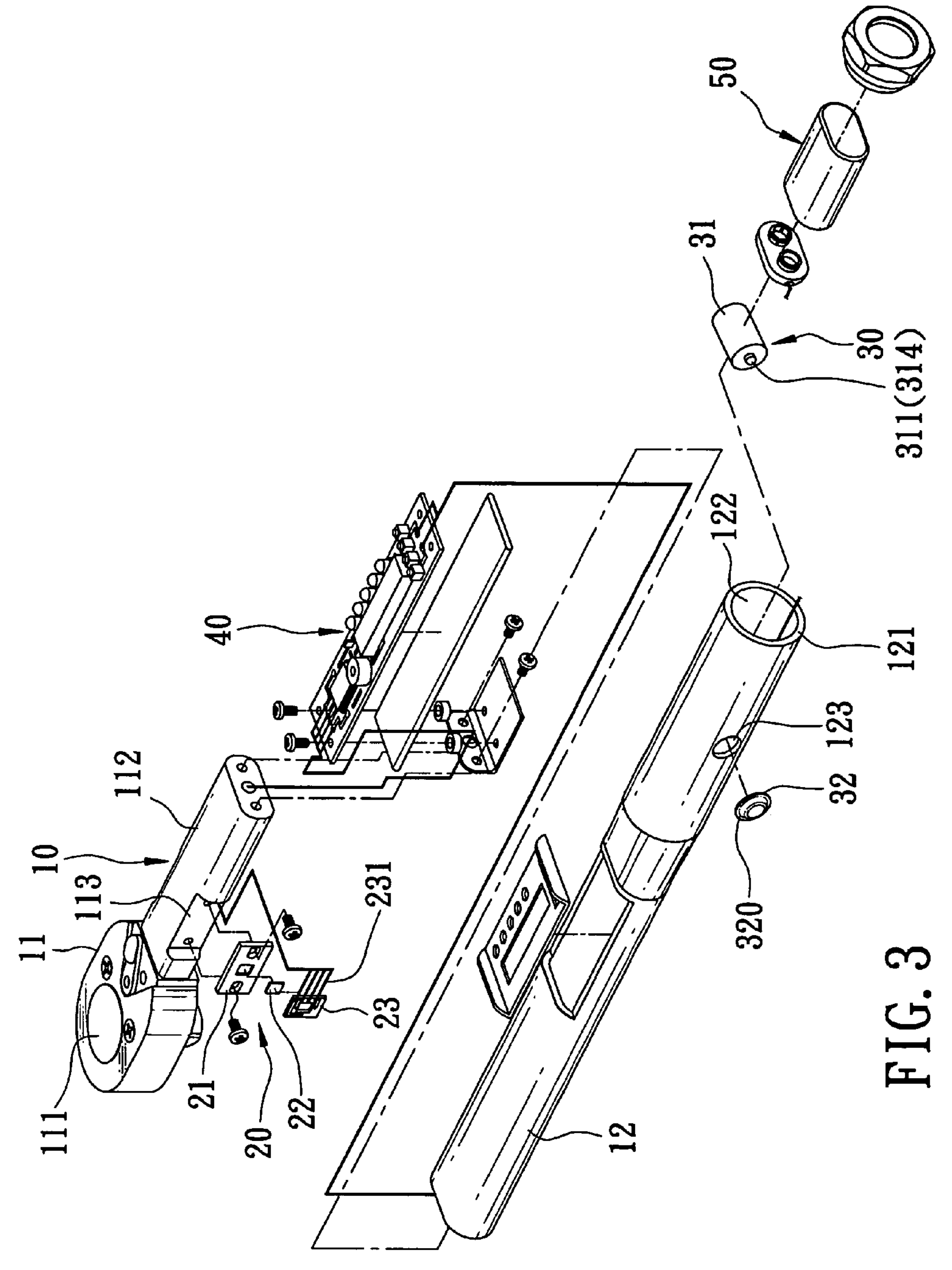
FIG. 3 is an exploded perspective view of the preferred embodiment.
Figure 4:
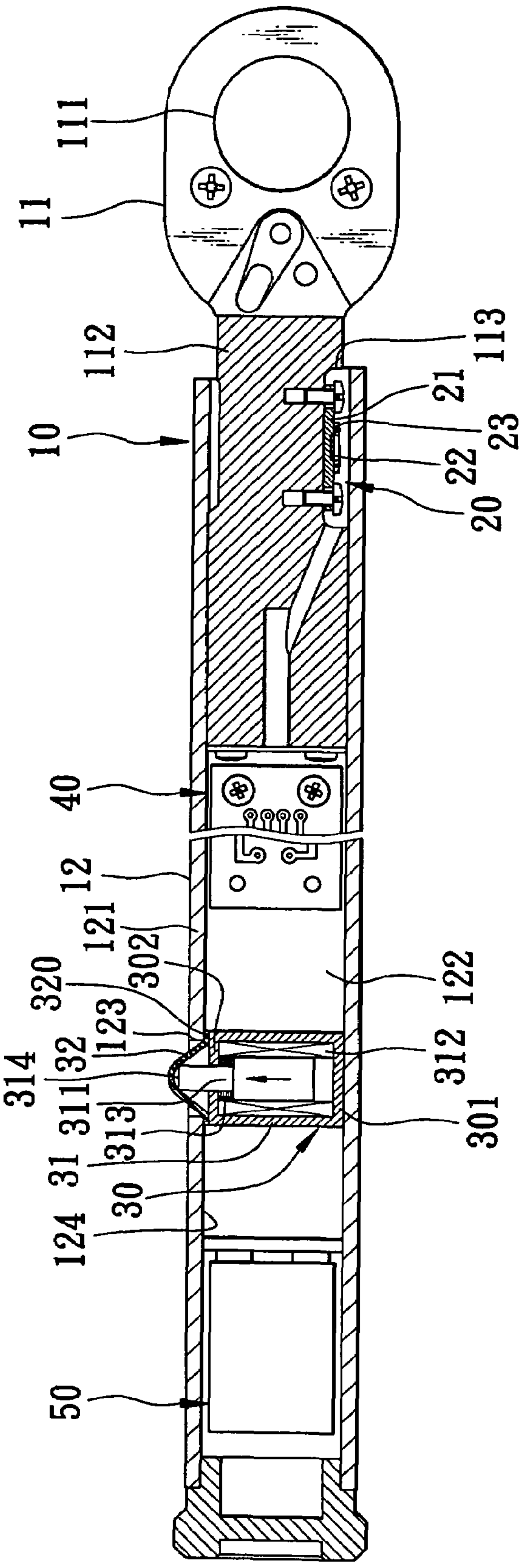
FIG. 4 is a fragmentary sectional view of the first preferred embodiment, illustrating a touching member in a first position.
Figure 5:
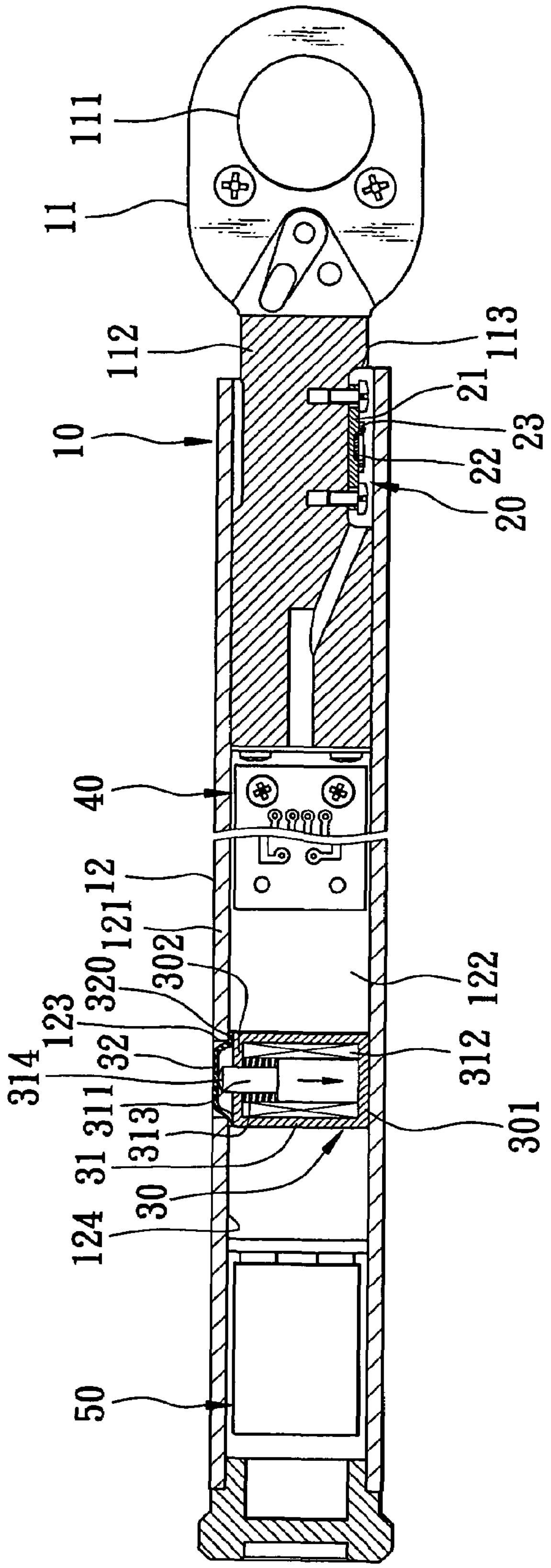
FIG. 5 is a view similar to FIG. 4, but with the touching member in a second position.
Figure 6:
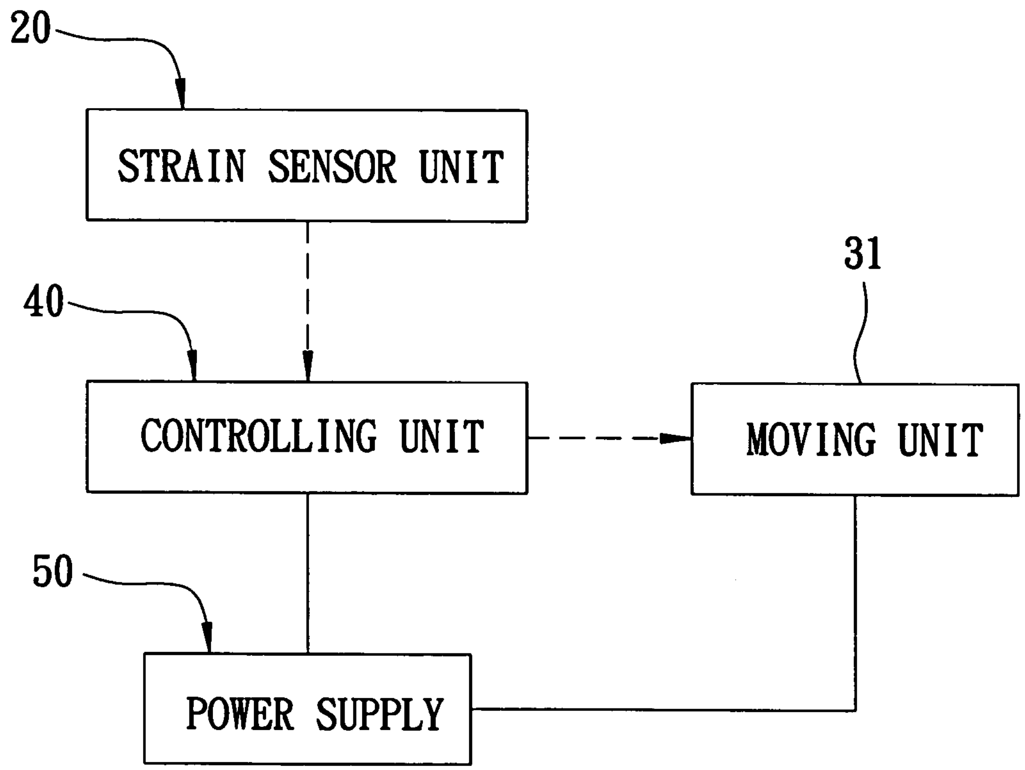
FIG. 6 is a schematic block diagram of the preferred embodiment, illustrating electrical connections among a strain sensor unit, a controlling unit, a power supply, and a moving unit.

Referring to FIGS. 2 to 6, the preferred embodiment of an electronic torque wrench according to the present invention is shown to comprise a main body 10, a strain sensor unit 20, an indicator unit 30, a controlling unit 40, and a power supply 50.

The main body 10 has a head portion 11, and a handle portion 12 connected to the head portion 11. The head portion 11 has a ratchet head 111, and a deflection beam 112 extending outwardly from the ratchet head 111. The handle portion 12 has a tubular wall 121, and a receiving space 122 defined by the tubular wall 121. The tubular wall 121 has a through hole 123 communicated with the receiving space 122. The deflection beam 112 is partially inserted into a front portion of the receiving space 122, and has a cutout portion 113 provided on a side surface thereof.

The strain sensor unit 20 includes a strain body 21 screwed to an end wall of the cutout portion 113 of the deflection beam 112, an integrated chip strain gauge 22 attached to the strain body 21, and a cover plate 23 fixed to an outer surface of the strain body 21. In this embodiment, the integrated chip strain gauge 22 includes a plurality of resistors formed on a substrate using a micro electromechanical system (MEMS) technology, and is connected electrically to contact points 231 of the cover plate 23.

The indicator unit 30 includes a moving unit 31 and a resilient pad 32. The moving unit 31, in this embodiment, is a solenoid actuator which has a plunger serving as a touching member 311 aligned with the through hole 123. The solenoid actuator further includes a main body 31 disposed in and across the receiving space 122 and having two opposite sides 301, 302 adjacent to an inner wall face 124 of the tubular wall 121, a magnetic coil 312 surrounding the touching member 311, and a spring member 313 sleeved on the touching member 311. The touching member 311 is movable reciprocatingly between a first position (see FIG. 4), where the touching member 311 protrudes outwardly of the through hole 123, and a second position (see FIG. 5), where the touching member 311 retracts into the through hole 123.

The pad 32 is disposed in the receiving space 122, and spans the through hole 123. The pad 32 has an outer peripheral end portion 320 fixed between the side 302 of the main body 31 and the inner wall face 124 of the tubular wall 121 that defines the through hole 123. The touching member 311 has a pushing end 314 that pushes the pad 32 to protrude outwardly of the through hole 123 when the touching member 311 is moved to the first position. When the touching member 311 is moved to the second position [ ], the pad 32 retracts into the through hole 123.

The controlling unit 40 is disposed in the receiving space 122 of the handle portion 12, and is connected electrically to the strain gauge 22 and the moving unit 31. In this embodiment, the controlling unit 40 is conventional, and has conventional components, such as a circuit board, a Wheatstone bridge, an amplifier, a recorder, a microprocessor, etc. Hence, the controlling unit 40 is not detailed herein.

The power supply 50 is disposed in the receiving space 122 of the handle 12, and is connected electrically to the moving unit 31 and the controlling unit 40. In this embodiment, the power supply 50 is exemplified as a battery.

When a user rotates a workpiece (not shown) using the electronic torque wrench of the present invention, the integrated chip strain gauge 22 transmits a signal in terms of changes in resistance to the controlling unit 40. The controlling unit 40 then determines the torque borne by the wrench of the present invention according to the received signal. If the torque is higher than a reference torque level, the controlling unit 40 will actuate the touching member 311 to move reciprocatingly between the first and second positions (see FIGS. 4 and 5) in a direction transverse to the handle portion 12. Therefore, the pad 32 is pushed out of the through hole 123 intermittently, and retracts into the through hole 123 alternately to contact directly and intermittently the user's hand, thereby warning the user to stop the operation. The object of the present invention is thus achieved.

Note that the strain sensor unit 20, the indicator unit 30, the controlling unit 40, and the power supply 50 are provided with proper electrical connections, which are conventional and are omitted herein for simplicity.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. An electronic torque wrench comprising:

a main body having a head portion, and a handle portion connected to said head portion, said handle portion having a tubular wall, and a receiving space defined by said tubular wall, said tubular wall having a through hole communicated with said receiving space;

a strain sensor unit disposed in said head portion;

an indicator unit disposed in said receiving space, and including a moving unit, said moving unit having a touching member aligned with said through hole and movable between a first position, where said touching member protrudes outwardly of said through hole, and a second position, where said touching member retracts into said through hole; and a controlling unit disposed in said main body and connected electrically to said strain sensor unit and said moving unit, said controlling unit actuating said touching member when said strain sensor unit detects a torque that is larger than a reference torque level.

2. The electronic torque wrench of claim 1, wherein said moving unit is a solenoid actuator, which has a plunger that defines said touching member, said plunger being movable between said first and second positions in a direction transverse to said handle portion.

3. The electronic torque wrench of claim 2, wherein said indicator unit further includes a pad spanning said through hole, said touching member pushing said pad to protrude outwardly of said through hole when said touching member is moved to said first position.

4. The electronic torque wrench of claim 1, wherein said head portion has a deflection beam, said strain sensor unit including a strain body connected to said deflection beam, an integrated chip strain gauge attached to said strain body, and a cover plate fixed to said strain body.

5. The electronic torque wrench of claim 1, wherein said controlling unit is disposed in said receiving space of said handle portion.

6. The electronic torque wrench of claim 1, further comprising a power supply disposed in said receiving space and connected electrically to said moving unit and said controlling unit.

* * * * *